US010871997B2

(12) United States Patent
Jurgens et al.

(10) Patent No.: US 10,871,997 B2
(45) Date of Patent: Dec. 22, 2020

(54) SYSTEM AND METHOD FOR ROUTING COMPUTING WORKLOADS BASED ON PROXIMITY

(71) Applicant: Cirba IP Inc., Richmond Hill (CA)

(72) Inventors: Henry Jurgens, Aurora (CA); Mikhail Kouznetsov, Maple (CA); Andrew Derek Hillier, Toronto (CA); Tom Yuyitung, Toronto (CA)

(73) Assignee: Cirba IP Inc., Markham (CA)

( * ) Notice: Subject to any disclaimer, the term of this patent is extended or adjusted under 35 U.S.C. 154(b) by 182 days.

(21) Appl. No.: 15/616,640

(22) Filed: Jun. 7, 2017

(65) Prior Publication Data

US 2017/0277569 A1    Sep. 28, 2017

Related U.S. Application Data

(63) Continuation of application No. PCT/CA2015/051296, filed on Dec. 9, 2015.

(60) Provisional application No. 62/089,496, filed on Dec. 9, 2014.

(51) Int. Cl.
  *G06F 9/50*      (2006.01)
  *H04L 29/08*    (2006.01)
  *G06F 9/46*      (2006.01)

(52) U.S. Cl.
  CPC .............. *G06F 9/5033* (2013.01); *G06F 9/46* (2013.01); *G06F 9/50* (2013.01); *H04L 67/1002* (2013.01); *H04L 67/1021* (2013.01)

(58) Field of Classification Search
  None
  See application file for complete search history.

(56) References Cited

U.S. PATENT DOCUMENTS

| | | | |
|---|---|---|---|
| 7,203,944 | B1 | 4/2007 | van Rietschote et al. |
| 7,356,679 | B1 | 4/2008 | Le et al. |
| 8,196,138 | B2 | 6/2012 | Allwell et al. |
| 8,347,297 | B2 | 1/2013 | Mateo |
| 8,723,699 | B2 | 5/2014 | Hyser et al. |
| 8,732,699 | B1* | 5/2014 | Hyser ................... G06F 9/5077 718/1 |
| 9,417,891 | B2* | 8/2016 | Beveridge ........... G06F 9/45558 |
| 2006/0069761 | A1 | 3/2006 | Singh et al. |
| 2006/0107087 | A1 | 5/2006 | Sieroka et al. |
| 2007/0271560 | A1 | 11/2007 | Wahlert et al. |
| 2009/0070771 | A1 | 3/2009 | Yuyitung et al. |

(Continued)

OTHER PUBLICATIONS

Khader, T.; International Search Report from corresponding PCT Application No. PCT/CA2015/051296; search completed Jan. 26, 2016.

(Continued)

*Primary Examiner* — Scott B Christensen

(74) *Attorney, Agent, or Firm* — CPST Intellectual Property Inc.; Brett J. Slaney

(57) ABSTRACT

A system and method are provided for routing workloads in an information technology infrastructure using models of same. The method includes determining at least one proximity group of workloads; determining at least one proximity zone in the infrastructure for routing each proximity group; and determining a workload routing solution subject to one or more constraints defined by one or more proximity based rules.

27 Claims, 8 Drawing Sheets

(56) References Cited

U.S. PATENT DOCUMENTS

2012/0159476 A1\* 6/2012 Ramteke ............... G06F 9/5033
718/1
2014/0337837 A1\* 11/2014 Padala ................. G06F 9/5072
718/1

OTHER PUBLICATIONS

Khanna, G.; "Applicaiton Performance Management in Virtulaized Server Environments", 1-4244-0143-7, IEEE.
Wood, T.; "Blakc-Box and Gray-box Strategies for Virtual Machine Migration", NSDI'07:4thUSENIXSymposium on Networked Systems Designs & Implementation; Apr. 11, 2007.

\* cited by examiner

SYSTEM AND METHOD FOR ROUTING COMPUTING WORKLOADS BASED ON PROXIMITY

CROSS-REFERENCE TO RELATED APPLICATIONS

This application is a continuation of PCT Application No. PCT/CA2015/051296 filed on Dec. 9, 2015 which claims priority to U.S. Provisional Patent Application No. 62/089,496 filed on Dec. 9, 2014, both incorporated herein by reference

TECHNICAL FIELD

The following relates to systems and methods for routing computing workloads to information technology (IT) infrastructure based on proximity.

DESCRIPTION OF THE RELATED ART

Workloads in computing environments typically take the form of bare-metal systems or virtual machines (VMs) running on information technology (IT) infrastructure in the form of host servers, storage and network devices, power supplies, etc.

IT infrastructure in large enterprises is typically organized into groups, wherein each group represents a pool of resource capacity with common capabilities. These infrastructure groups can be logically organized into proximity zones to define boundaries for routing workloads that need to be kept together or apart.

When routing workloads to IT infrastructure, existing solutions typically consider the following:

- Whether or not the workloads are compatible with the infrastructure, that is, determine if workload requirements (e.g. SLA, low latency storage, internet connectivity, security, etc.) match infrastructure capabilities (e.g. redundancy, storage tier, etc.).
- Whether or not the workload resource demands fit in the available infrastructure supply, that is, the available capacity for CPU, memory, disk IO, network IO, storage, etc. in the infrastructure is greater or equal to that required by the workloads.

While these solutions handle compatibility and capacity checks, the relative placements for groups of workloads in the infrastructure may be overlooked.

It is an object of the following to address at least one of the above disadvantages.

SUMMARY

The relative placements for groups of workloads in the infrastructure can be addressed by considering workload proximity, for example, workload affinity or anti-affinity requirements with respect to infrastructure boundaries. This relates to constraints on the relative placements for groups of workloads in the infrastructure.

It has been found that existing enterprise workload routing solutions handle compatibility and capacity checks, but do not necessarily consider workload proximity. There are solutions with VM-VM affinity and anti-affinity rules, which have similarities to these "proximity" requirements, i.e. wherein VM-VM affinity specifies to keep VMs together on same host, and VM-VM anti-affinity specifies keep VMs apart on different hosts. However, the rules used by such solutions confine the scope of the rules to a virtual cluster and do not apply to the general IT infrastructure, and the proximity zone (infrastructure boundary) for these rules is a host.

The following describes systems and methods for the routing of workloads with resource demands and diverse needs to IT infrastructure with available capacity and different capabilities while also considering the proximity requirements of the workloads.

In one aspect, there is provided a method of routing workloads in an information technology infrastructure using models of same, the method comprising determining at least one proximity group of workloads; determining at least one proximity zone in the infrastructure for routing each proximity group; and determining a workload routing solution subject to one or more constraints defined by one or more proximity based rules.

In an implementation of the method, the workload routing solution is determined by determining at least one criterion for determining the workload routing solution when not all of the constraints can be met. The at least one criterion can include any one or more of maximizing a number of workloads, maximizing a number of applications routed, prioritizing workloads to be routed, or prioritizing applications to be routed.

BRIEF DESCRIPTION OF THE DRAWINGS

Embodiments will now be described by way of example only with reference to the appended drawings wherein.

DETAILED DESCRIPTION

Figure 1:
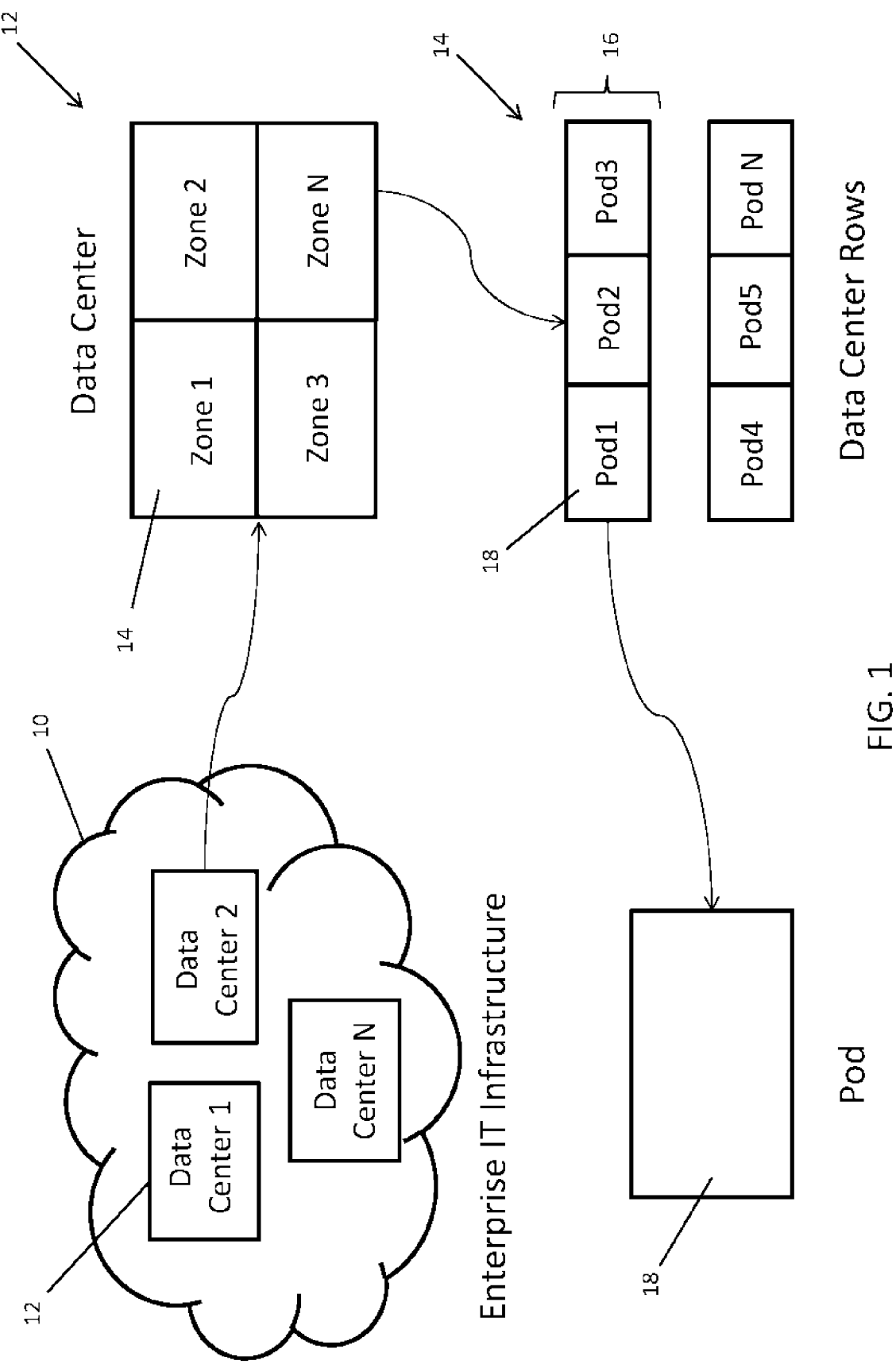
FIG. 1 is a schematic diagram of an example of an enterprise IT infrastructure having datacenters with one or more zones of pods.
Figure 2:
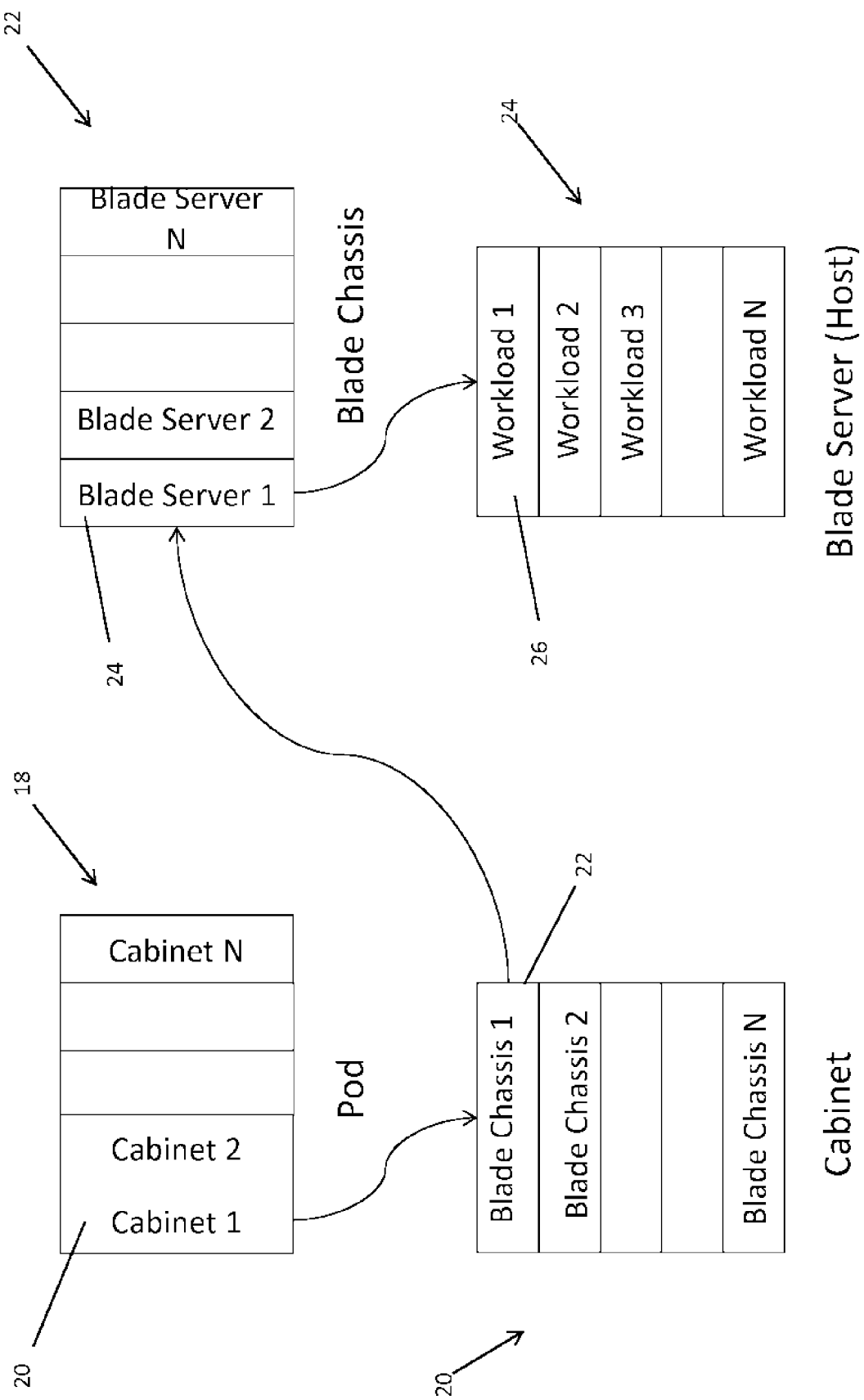
FIG. 2 is a schematic diagram of an example of a configuration for a pod having one or more cabinets, having one or more blade chassis and blade servers, which host one or more workloads.

Turning now to the figures, FIGS. 1 and 2 illustrate an example of an IT infrastructure 10 that can be used to host workloads 26. The IT Infrastructure 10 can be in the form of servers, storage devices, network switches, virtualization technology, etc. The IT infrastructure 10 can be grouped based on physical relationships—e.g. location, datacenter, datacenter zones, rows, pods, server cabinets/racks, etc.; and/or can be grouped based on logical relationships—e.g., VMware management cluster, etc. The IT infrastructure groups represent a pool of capacity and can have different capabilities.

As illustrated in FIG. 1, the IT infrastructure 10 can include 1 to N data centers 12, and each data center 12 can include 1 to N zones 14. Each zone 14 can include 1 to N data center rows 16, and each row 16 can include 1 to N pods 18. In FIG. 2 it can be seen that each pod 18 is comprised of 1 to N cabinets 20, each cabinet 20 including 1 to N blade chassis 22. Each blade chassis 22 can include 1 to N blade servers 24, which can each host 1 to N workloads 26.

Table 1 below illustrates various business drivers for workload proximity, showing examples of different levels of physical hierarchy of infrastructure 10.

TABLE 1

Business Drivers for Workload Proximity

| Proximity Zone Types | Examples of Proximity Zones | Examples of Reasons to be apart | Examples of Reasons to be together |
|---|---|---|---|
| Location | NYC, Toronto | Disaster recovery | N/A |
| Data Center | NYC-DC1, NYC-DC2 | Disaster recovery | Low latency |
| Data Center Zone | NYC-DC1-1 | High availability (zone power failure) | Low latency |
| Data Center Row/Pod | NYC-POD1, NYC-POD2, etc. | High availability (Pod hardware failure) | Low latency |
| Cabinet/ Rack | CAB01, CAB02, etc. | High availability (cabinet/ rack failure) | Low latency |
| Blade Chassis | BC01, BC02 | High availability (chassis failure) | Low latency |
| Host System | ESX01, ESX02, etc | High availability (server failure), Load balancing | Low latency, software licensing |

Performance is a common reason for keeping workloads 26 together. For example, workloads 26 may be kept together for better inter-workload communication—e.g. lower network latency, higher network throughout, etc. Workloads 26 may also be kept together to provide access to shared resources such as storage. Resiliency is a common reason for keeping workloads 26 apart. For example, workloads 26 may be kept apart to avoid having a single point of failure—e.g. independent power supply, external storage, network switches, etc.

Workload routing based on proximity can be achieved by having proximity zones. A proximity zone is a grouping of infrastructure that defines a boundary for keeping workloads together or apart. It can be appreciated that different types of proximity zones can be defined For example, a performance zone can correspond to the infrastructure located in the same blade chassis, rack, cabinet, pod, etc. A resiliency zone can correspond to the infrastructure located in the same cabinet, pod, data center row, data center, etc. A proximity zone can be both a performance zone and resiliency zone. For example, a blade chassis 22 can be considered to be both a performance and resiliency zone, since inter-blade communication between blades 24 in the chassis 22 results in excellent network performance, with low network latency, high throughput; and the blade chassis' power supplies represent a point of failure making it also a resiliency zone.

Figure 3:
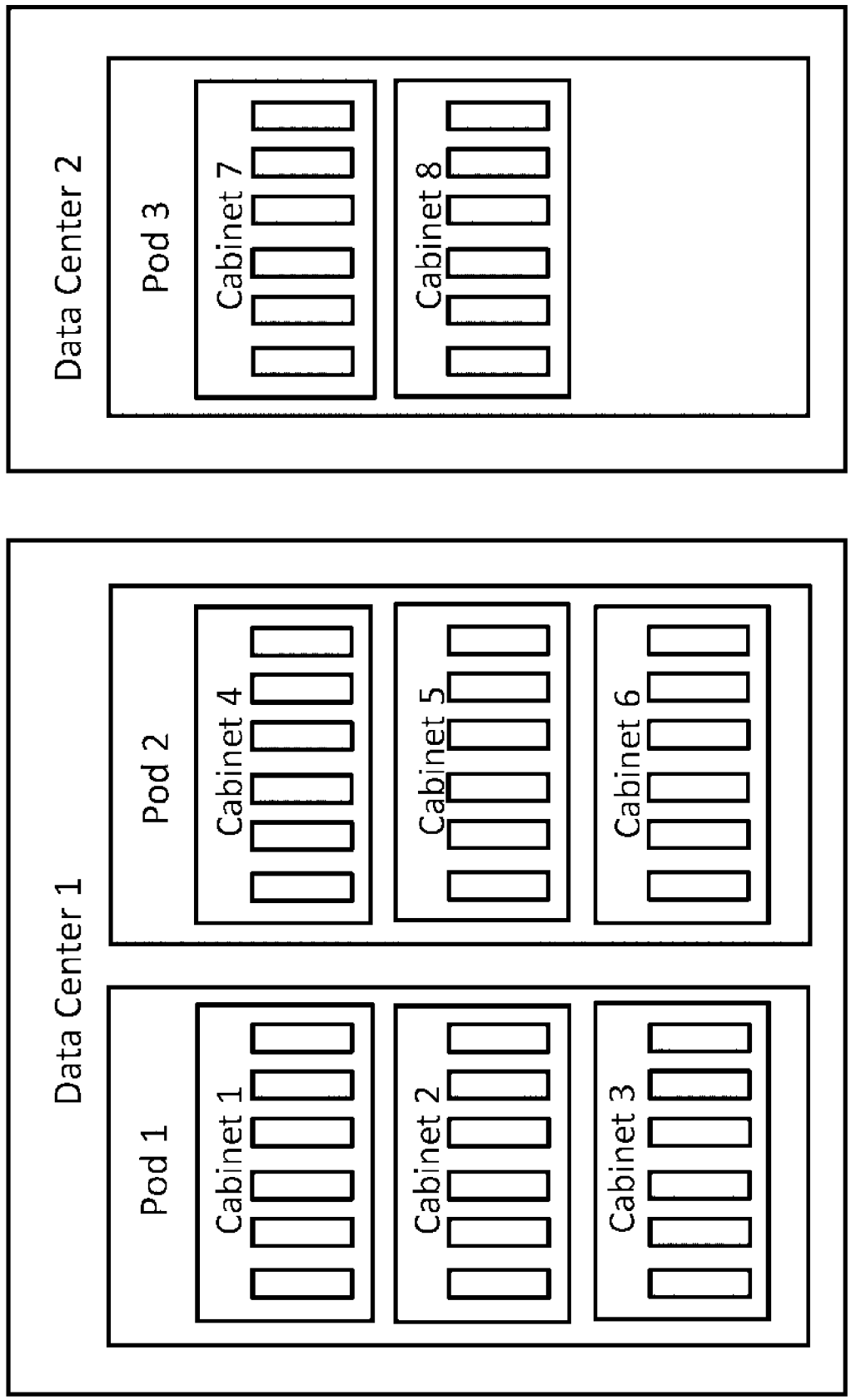
FIG. 3 is a schematic diagram of an example of an IT Infrastructure having a pair of datacenters.

FIGS. 3 to 6 and Tables 2 through 6 described below, provide an example of a workload routing process applied to an example IT infrastructure 10 shown in FIG. 3. For clarity, the components of the IT infrastructure 10 relevant to the following example may be referred to by their labels shown in FIGS. 3 to 6, e.g., Data Center 1, Data Center 2, etc. instead of or in addition to the reference numerals used in FIGS. 1 and 2.

Figure 4:
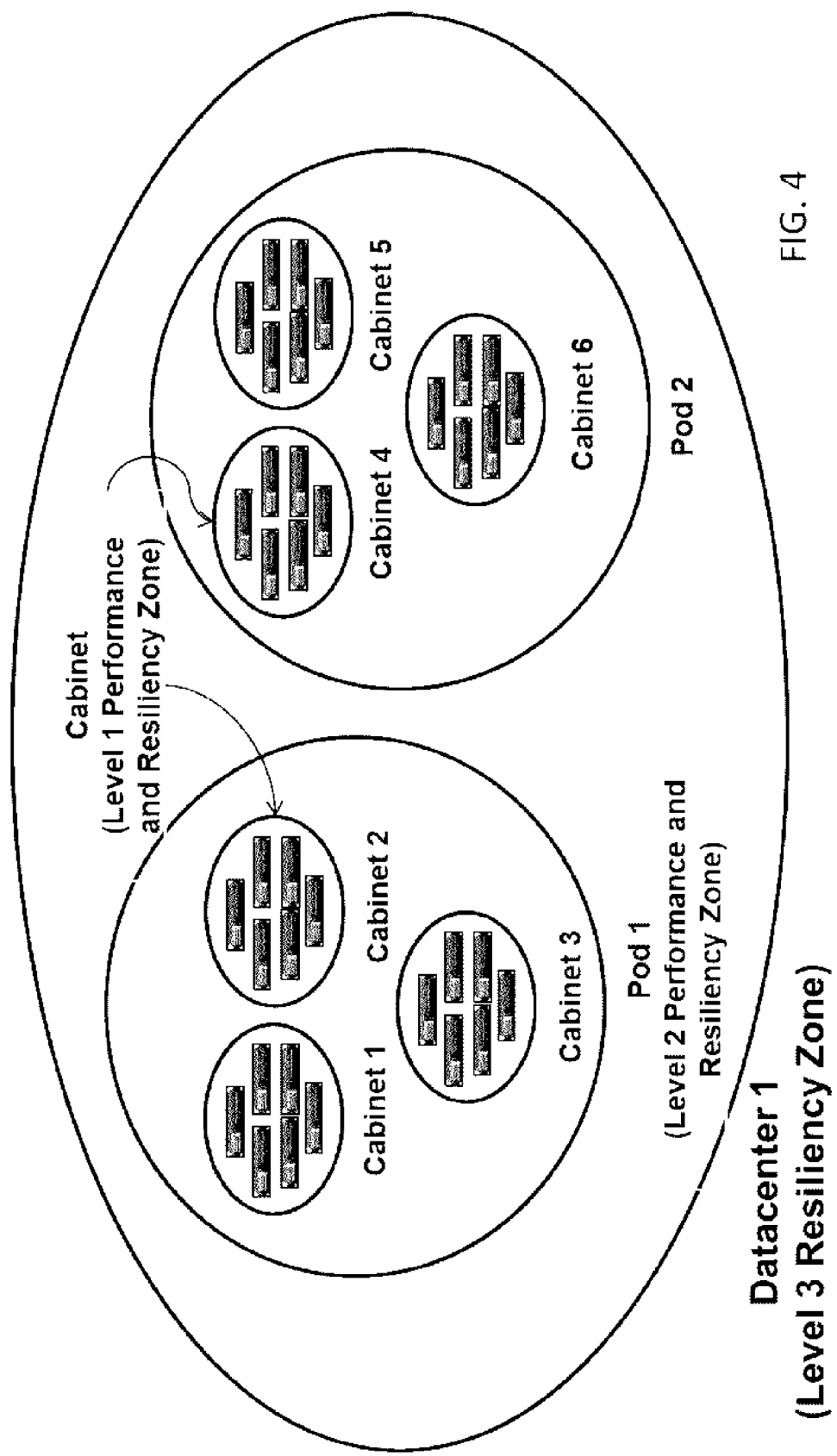
FIG. 4 is a schematic diagram of example proximity zones for a first data center in the example IT infrastructure shown in FIG. 3.

In the example shown in FIG. 4, consider two datacenters (Data Center 1 and Data Center 2). Each data center 12 includes multiple pods 18, each pod 18 being comprised of multiple server cabinets 20, and each cabinet 20 containing multiple servers 24.

Table 2 below lists the hosts, cabinets, pods, and data centers in the example IT infrastructure. In this example, it is assumed that each cabinet 20 contains six hosts.

TABLE 2

Example Infrastructure

| Hosts | Cabinet | Pod | Datacenter |
|---|---|---|---|
| Host 1-6 | Cabinet 1 | Pod 1 | Data Center 1 |
| Host 7-12 | Cabinet 2 | Pod 1 | Data Center 1 |
| Host 13-18 | Cabinet 3 | Pod 1 | Data Center 1 |
| Host 19-24 | Cabinet 4 | Pod 2 | Data Center 1 |
| Host 25-30 | Cabinet 5 | Pod 2 | Data Center 1 |
| Host 31-36 | Cabinet 6 | Pod 2 | Data Center 1 |
| Host 37-42 | Cabinet 7 | Pod 3 | Data Center 2 |
| Host 43-48 | Cabinet 8 | Pod 3 | Data Center 2 |

Example proximity zones are listed in Table 3 below. Each cabinet 20 can be considered to be both a performance zone, and a resiliency zone (Zone Level 1 shown in FIGS. 4 and 5). Similarly, each pod 18 can also be modeled as a performance zone and a resiliency zone (Zone Level 2 shown in FIGS. 4 and 5). Each data center 12 can be modeled as a resiliency zone to support disaster recovery in case of a data center failure (Zone Level 3 in FIGS. 4 and 5).

TABLE 3

Example Proximity Zones

| Proximity Zone Type | Level | Performance Zone | Resiliency Zone |
|---|---|---|---|
| Cabinet | 1 | Yes | Yes |
| Pod | 2 | Yes | Yes |
| Data Center | 3 | No | Yes |

Figure 5:
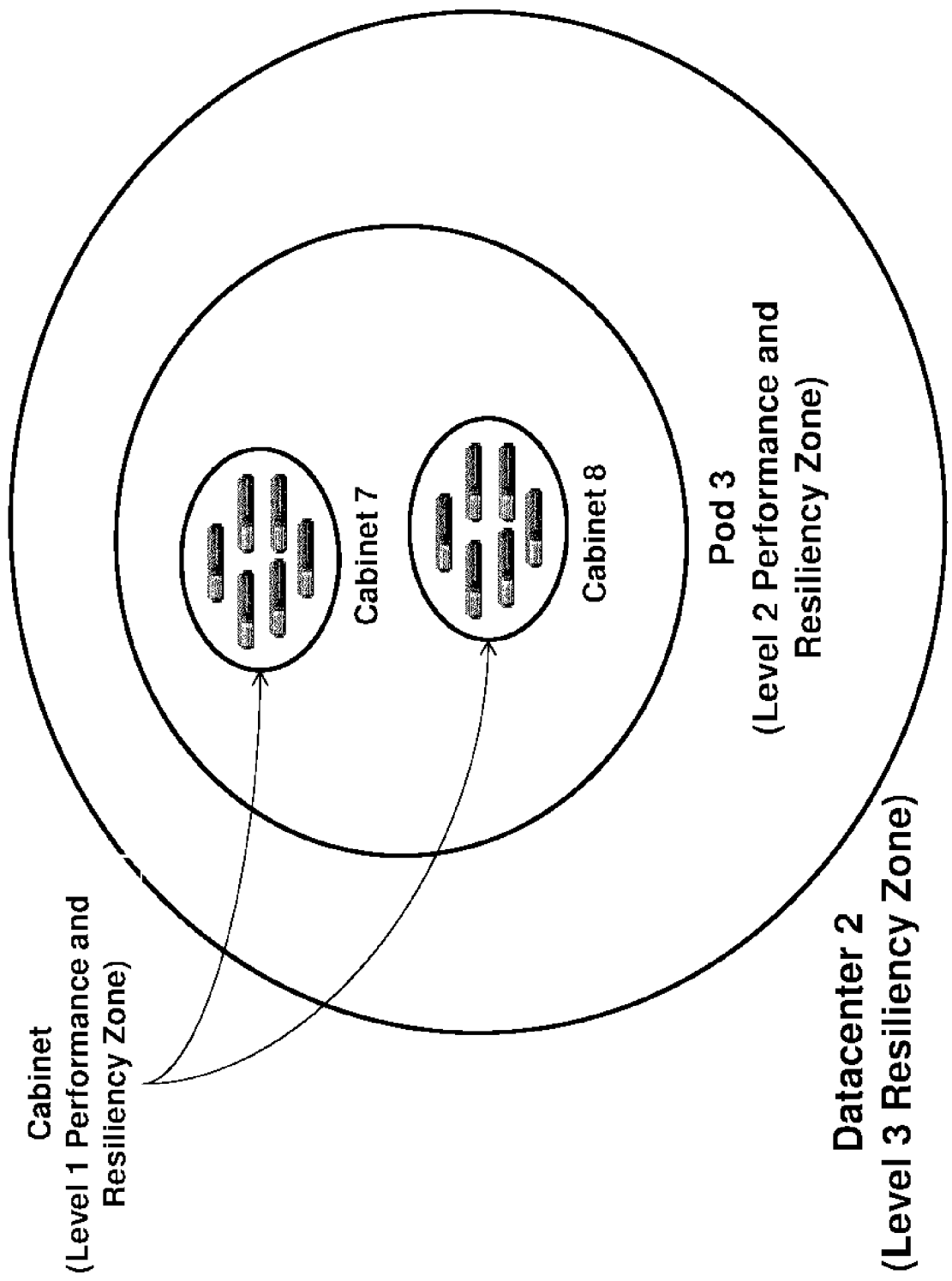
FIG. 5 is a schematic diagram of example proximity zones for a second data center in the example IT infrastructure shown in FIG. 3.

FIG. 4 depicts Data Center 1 as nested proximity zones, and FIG. 5 depicts Data Center 2 as nested proximity zones.

Proximity groups can also be defined, which involves the grouping of workloads to define a membership of workloads to keep together or apart in corresponding proximity zones. It can be appreciated that different types of proximity groups can be defined and associated with specific types of proximity zones. Also, proximity groups often relate to applications or business services that are implemented through multiple workloads. Some common types of proximity groups include:

Application: Proximity group corresponding to the workloads comprising an application or business service.

App Instance: Proximity group corresponding to the workloads comprising an application instance (e.g. PROD vs. DR—see FIG. 6).

App Sub-instance: Proximity group corresponding to a sub-set of the workloads of an application instance—e.g. web server, app server, load balancer, database, etc.

An example illustrating proximity groups is provided in Table 4 below and FIG. 6. In this example, the application is called "SAP", and the SAP application has production and disaster recovery (DR) instances. Each application instance is comprised of multiple workloads, namely:

1. SAP Production is comprised of 3 app servers, 2 web servers and 1 database server; and
2. SAP DR is comprised of 2 app servers, 1 web server and 1 database server.

Routing rules are also defined, in which all the workloads 26 of each application instance are routed to a performance zone.

Workloads belonging to an application instance that serve the same function (e.g. App servers, Web servers) can comprise an app sub-instance group and should be routed to different resiliency zones for better resiliency. Application instances of the same application should be routed to different resiliency zones to improve resiliency at the application level.

TABLE 4

Example Proximity Groups

| Workload | Application | App Sub-Instance Group | App Instance Group |
|---|---|---|---|
| APP1 | SAP | App Server | PROD |
| APP2 | SAP | App Server | PROD |
| APP3 | SAP | App Server | PROD |
| WEB1 | SAP | Web Server | PROD |
| WEB2 | SAP | Web Server | PROD |
| DB1 | SAP | DB Server | PROD |
| APP4 | SAP | App Server | DR |
| APP5 | SAP | App Server | DR |
| WEB3 | SAP | Web Server | DR |
| DB2 | SAP | DB Server | DR |

Various proximity rules can be used to implement the workload routing. Each proximity rule can be specified to apply to all or a sub-set of the workloads and infrastructure. Rule specifications can include the following properties: Rule Type, Mandatory flag, Proximity Group Type, Proximity Zone Type, Rule Scope based on Group Type(s), etc. There are three types of proximity rules for routing workloads, namely affinity, anti-affinity, and group-level anti-affinity. These rules can be specified to be mandatory or optional. If mandatory, the rule is enforced when routing the workloads. If optional, the routing algorithm will try to apply the rule, when possible.

The proximity group type specifies the grouping of workloads that the rule applies to, and the proximity zone type specifies the infrastructure boundaries to consider when applying the rule. The rule scope specifies the proximity group type that further defines the group of workloads that the rule applies to. Example proximity rules are listed below in Table 5.

TABLE 5

Example Proximity Rules

| Rule # | Proximity Rule Type | Mandatory | Proximity Group Type | Proximity Zone Type | Rule Scope (Group Type) |
|---|---|---|---|---|---|
| 1 | Affinity | Yes | App Instance | Pod | Application |
| 2 | Anti-Affinity | No | App Sub-Instance | Cabinet | Application, App Instance |
| 3 | Group-level Anti-Affinity | No | App Instance | Data Center | Application |
| 4 | Group-level Anti-Affinity | Yes | App Instance | Pod | Application |

The first rule in Table 5 is a mandatory affinity rule. This rule ensures that workloads members of the specified proximity group (i.e. app instance) as kept together in the same proximity zone (pod). The rule scope specifies "application" as the group type to indicate that this rule applies to the app instances (e.g. PROD, DR) of the same application (e.g. SAP).

The second rule is an optional anti-affinity rule. This rule optionally tries to ensure that workload members of the specified proximity group (i.e. app sub-instance) are kept apart in different proximity zones (cabinet). The rule scope specifies "application" and "app instance" as the group types to indicate that this rule applies to app sub-instances (e.g. app server, web server) of the same application and same app instance (e.g. SAP PROD, SAP DR).

The third rule is an optional group-level anti-affinity rule. This rule optionally tries to ensure the specified group type (i.e. app instance) is kept apart in different proximity zones (data centers) at the group level. The rule scope specifies "application" as the group type to indicate that this rule applies to app instances (e.g. PROD, DR) of the same application (e.g. SAP). It may be noted that the applicability of the rules can be restricted to a subset of workloads or infrastructure. For example, it is possible to specify a rule applicability filter (e.g. app instance must be PROD or DR) to indicate which workloads this rule applies to. Such a filter would indicate that the rule would not apply to other app instances (e.g. UAT, DEV).

The fourth rule is a mandatory group-level anti-affinity rule. The rule serves as a fallback for the third rule. Instead of trying to keep app instances apart in different data centers, the rule ensures that app instances are kept are in different pods, at the group level. As with the third rule, the rule scope specifies application as the group type to indicate that the rule applies to app instances of the same application.

For routing criteria, when routing more than one workload, a user can specify the priority by which the workloads are routed, and whether to maximize number of workloads vs. number of applications to be routed.

Figure 6:
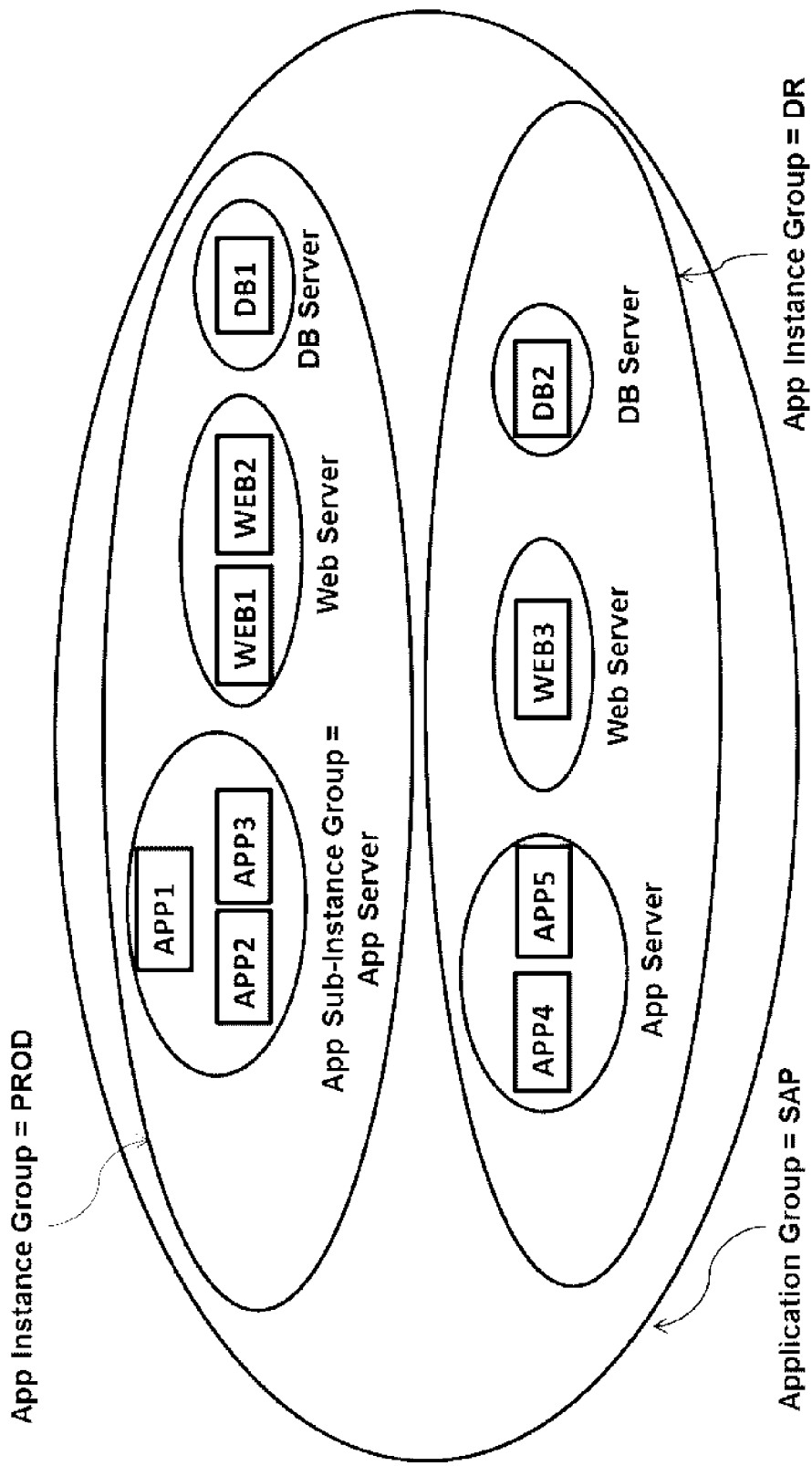
FIG. 6 is a schematic diagram of example proximity groups.
Figure 7:
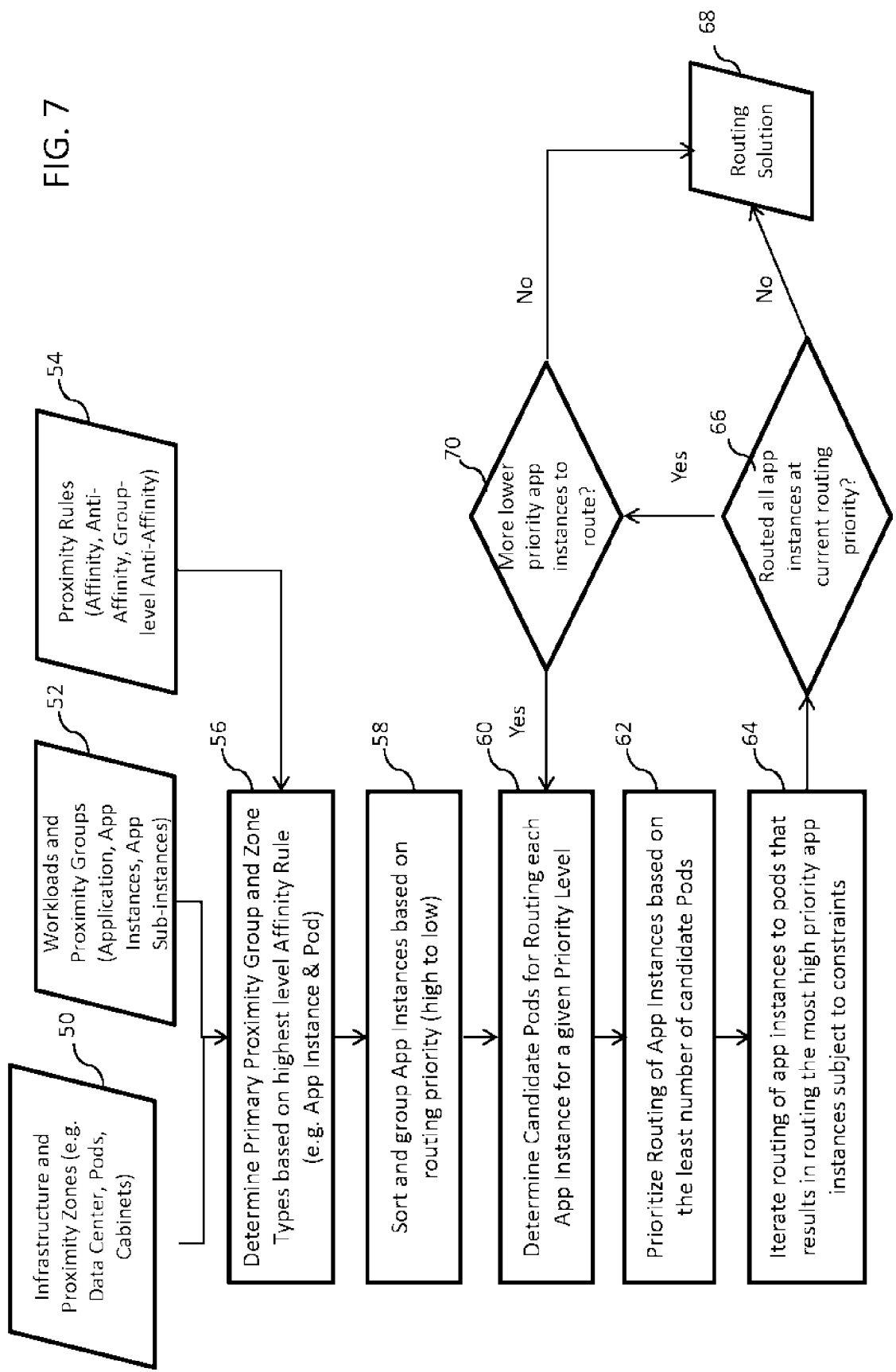
FIG. 7 is a flow chart illustrating example computer executable instructions that can be performed in applying a workload routing algorithm based at least in part on proximity zones and groups depicted in FIGS. 3 and 6.

Turning now to FIG. 7, a routing process is shown. A computer program implementing the process takes as inputs, the infrastructure and proximity zones (e.g., data center, pods, cabinets, etc.) to host workloads at step 50, the workloads and proximity groups (e.g. application, app instances, app sub-instances, etc.) to be routed at step 52, and the proximity rules (e.g., affinity, anti-affinity, group level anti-affinity, etc.) at step 54. The program then determines a workload routing solution that maximizes the number of workloads routed subject to the constraints defined by proximity-based rules, workload-infrastructure compatibility and available capacity. For example, at step 56, the program determines the primary proximity group and the zone types based on the highest level affinity rule that is applicable to the proximity groups, zones and rules specified. For this example, the highest level proximity group and zone types associated with an affinity rule are the app instance (primary proximity group) and pod (primary proximity zone), In the example shown in FIG. 6, there are two application instance groups: SAP-PROD, SAP-DR.

The primary proximity groups (app instances) are sorted at 58 based on the highest to lowest routing priority. According to the example shown in FIG. 6, app instances are sorted and grouped by routing priority and it can be assumed for this illustration that SAP-PROD and SAP-DR are the same priority. As shown in FIG. 7, the candidate proximity zones (e.g. pods 18) for each proximity group (app instance) of the current highest priority are then determined at 60—based on compatibility, capacity and existing proximity constraints.

The program determines proximity zones (e.g., pods) that are candidates for routing each application instance by evaluating all the workloads belonging to the app instance. An initial assessment can be made for candidate zones that considers compliance with: proximity with existing applications and workloads, sufficient available aggregate capacity, and workload requirements and compatibility with infrastructure capabilities.

In the example shown in FIG. 6, SAP-PROD can be routed to Pod 1 or 2, but not Pod 3 due to the optional anti-affinity rule to keep the "App Server" workloads apart in different cabinets. Specifically, SAP PROD app instance includes 3 App Server workloads but Pod 3 only contains 2 cabinets. In contrast, the SAP-DR app instance can be routed to Pod 1, 2 or 3.

At step 62, the program prioritizes routing of application instance groups with the least number of candidate proximity zones. If there are the same number of candidates, the program can prioritize groups based on an earliest submission timestamp for routing the request. In this example, SAP-PROD can be routed to fewer target zones (2 pods) than SAP-DR (3 pods), so SAP-PROD would be routed first, followed by SAP-DR.

At step 64, the program iterates the routing of application instance groups to the pods until a set of routing decisions is found that routes the highest number of groups. A group can be considered to be successfully routed if it is confirmed that all workloads can be routed to the infrastructure subject to the compatibility, capacity and proximity routing constraints. For example, route SAP-PROD to Pod 1 in Data Center 1, and route SAP-DR to Pod 3 in Data Center 2 since it should be in a different datacenter than the just-routed SAP-PROD application instance.

If it is determined at 66 that not all applications/workloads can be routed at the current routing priority, the program chooses a solution that optimizes the user-specified routing criteria, for example: maximize routing the number of application instances based on their routing priority, route workloads to infrastructure with most available capacity vs. lowest cost, and whether to exit, if unable to route all workloads of the current routing priority.

At step 70, the program determines if more lower priority app instances need to be routed and the program routes the remaining workloads with next highest routing priority. The program returns to step 60 if there are more workloads to route and ends the process if no more workloads to route. The routing solution is then provided at step 68.

An example routing solution is provided below in Table 6.

TABLE 6

Example Workload Routing Solution

| Workloads/Applications | | | | Proximity Zone | | |
|---|---|---|---|---|---|---|
| Workload | App Name | App Sub-Instance Group | App Instance Group | Data Center | Pod | Cabinet |
| APP1 | SAP | App Server | PROD | Data Center 1 | Pod 1 | Cabinet 1 |
| APP2 | SAP | App Server | PROD | | | Cabinet 2 |
| APP3 | SAP | App Server | PROD | | | Cabinet 3 |
| WEB1 | SAP | Web Server | PROD | | | Cabinet 1 |
| WEB2 | SAP | Web Server | PROD | | | Cabinet 2 |
| DB1 | SAP | DB Server | PROD | | | Cabinet 1 |
| APP4 | SAP | App Server | DR | Data Center 2 | Pod 3 | Cabinet 7 |
| APPS | SAP | App Server | DR | | | Cabinet 8 |
| WEB3 | SAP | Web Server | DR | | | Cabinet 8 |
| DB2 | SAP | DB Server | DR | | | Cabinet 7 |

In the above example, the SAP PROD app instance is routed to Pod 1 in Data Center 1, wherein App Server workloads are distributed between the 3 cabinets (1, 2, 3), Web Server workloads are distributed between the 2 cabinets (1, 2), and the DB server is routed to cabinet 3. As noted earlier, the SAP PROD app instance could also have been routed to Pod 2 in Data Center 1. In this example, the program can have chosen Pod 1 over Pod 2 since the infrastructure in Pod 1 has more available capacity or has a lower cost than Pod 2. On a similar note, the DB server of the PROD app instance could also have been routed to Cabinet 2 or 3 (instead of Cabinet 1). In general, when there are multiple options for routing workloads, the infrastructure with the most capacity available or lower cost is selected. The SAP DR instance is routed to Pod 3 in Data Center 2, wherein App server workloads are distributed between 2 cabinets (7, 8), and Web and DB servers are routed to cabinet 7. Routing the DR app instance to Pod 3 ensures that the SAP PROD and DR app instances are routed to different Data Centers for better resiliency as guided by Rule 3 in Table 5.

For routed workloads 26, when the actual workloads 26 are routed and deployed in the target infrastructure 10, the workloads 26 are assigned the proximity groups (e.g. application, app instance, app sub-instance) they were evaluated with when they were routed. This assignment of the workload proximity groups allows the program to detect workloads that are not in compliance with the proximity rules. The assignment of proximity groups to the workloads also allows the routing program to ensure that subsequently routed workloads comply with the existing workloads with respect to the proximity requirements. For example, if an additional web server workload is to be routed for the SAP PROD app instance, it would be routed to Cabinet 3 in Pod 1 to ensure that it is kept together in the same pod with the PROD app instance, and kept apart from the other web server instances previously deployed in Cabinets 1 and 2, respectively.

In a re-routing scenario, after routing and deploying workloads 26 to infrastructure, some workloads 26 may need to be re-routed to a different infrastructure group/zone due to a variety of reasons, for example: the current infrastructure that the workload is running in is out of resource capacity, the workload is not compatible with the infrastructure, or non-compliance with respect to workload proximity rules, etc. If non-compliant applications/workloads are present, the program uses the workload routing process to determine the best location to route the workloads. If there is no better location to deploy workloads, the program determines not to route elsewhere. However, if there is a better location to deploy workloads, the program can generate a recommendation to re-route the workloads 26.

Figure 8:
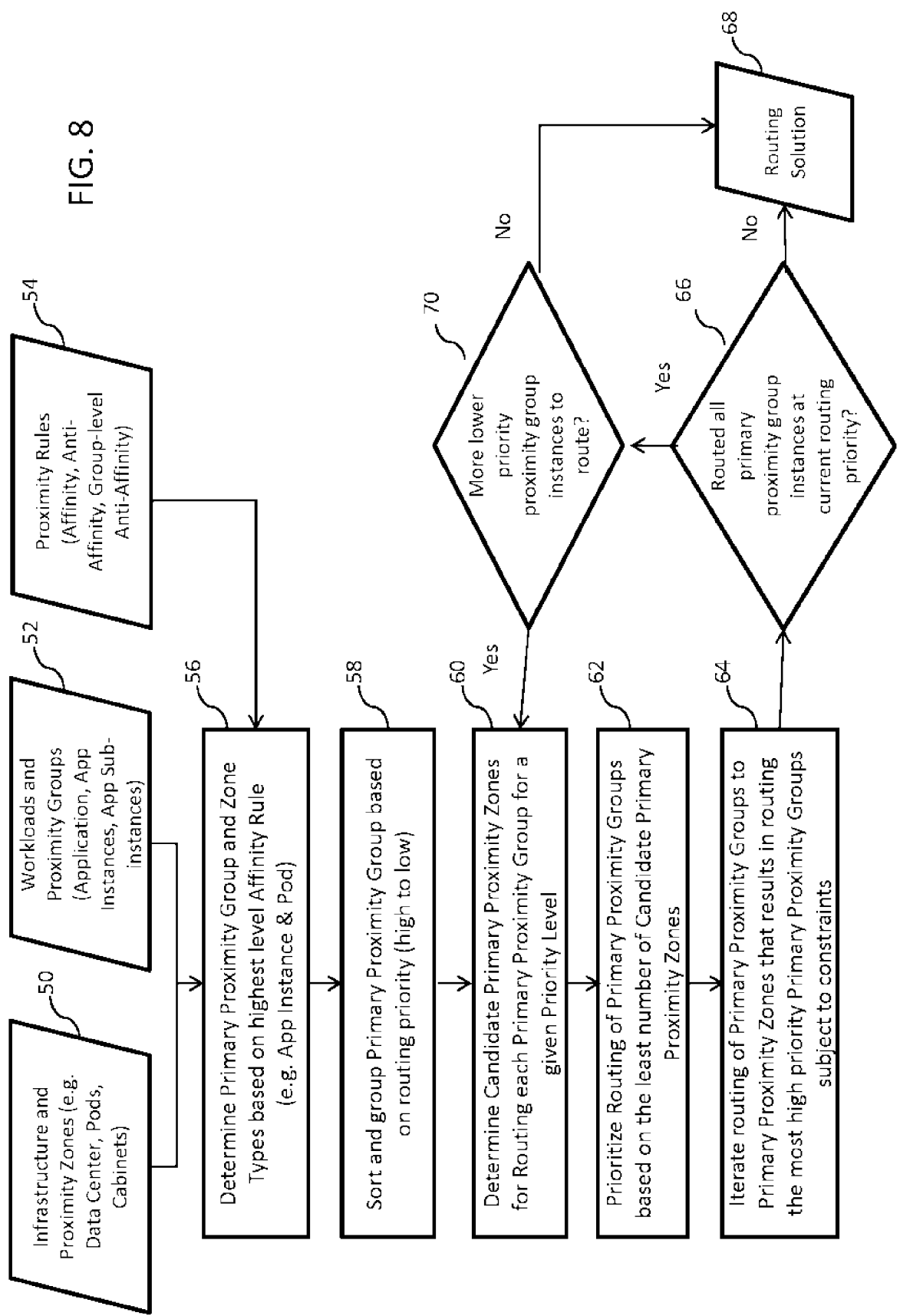
FIG. 8 is a flow chart illustrating example compute executable instructions that can be performed in applying a generalized workload routing algorithm based at least in part on proximity.

FIG. 8 illustrates the same flow chart as depicted in FIG. 7, but with the generic terminology (e.g., "proximity group", "proximity zone") to demonstrate the applicability of the example in FIG. 7 to other IT infrastructures. For example, the app instances in FIG. 7 can be generalized as a primary proximity group, and the pods can be generalized as a candidate primary proximity zones for routing each primary proximity group. Accordingly, it can be appreciated that the example shown in FIG. 7 is for illustrative purposes and should not be considered limiting.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of any component of or related to the IT infrastructure 10, etc., or accessible or connectable thereto. Any application or module herein described may be implemented using computer readable/executable instructions that may be stored or otherwise held by such computer readable media.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A method of routing application instances in an information technology infrastructure, the method comprising:
 defining, from a plurality of workloads, a plurality of groups of workloads, each workload in a same group having similar hosting requirements, each different group of workloads capable of having different hosting requirements than another group of workloads;
 determining at least one application model from the groups of workloads;
 determining an infrastructure proximity zone model comprising a plurality of physical or logical infrastructure zones, each zone comprising a grouping of infrastructure defined by a boundary for keeping groups of workloads together or apart, wherein boundaries of the infrastructure zones are defined by performance or resiliency characteristics of the infrastructure,
  wherein the infrastructure zones include both Performance zones and resiliency zones, where a performance zone corresponds to infrastructure located in the same physical or logical location for higher performance and a resiliency zone corresponds to infrastructure not located in the same physical or logical location for higher resiliency;
 computing a workload routing solution based on the at least one application model and the infrastructure proximity zone model, wherein the routing solution specifies a placement of each group of workloads into a corresponding infrastructure zone of the infrastructure zones that satisfies their performance or resiliency requirements based on corresponding performance and resiliency characteristics of the infrastructure zone model,
  wherein the computing includes the evaluation of available capacity in the infrastructure zones; and
 deploying the workloads in the groups to the infrastructure in the infrastructure zones of the information technology infrastructure according to the workload routing solution.

2. The method of claim 1, wherein computing the workload routing solution comprises using one or more proximity-based rules.

3. The method of claim 1, wherein computing the workload routing solution comprises selecting infrastructure with the most capacity available or a lower cost.

4. The method of claim 1, wherein computing the workload routing solution comprises:
 sorting the groups based on a routing priority; and
 determining the workload routing solution by evaluating placement of the groups against the infrastructure zones in priority order and iterating until there are no more workloads to route.

5. The method of claim 2, further comprising determining a primary proximity group and corresponding proximity zone type based on the one or more proximity-based rules.

6. The method of claim 1, wherein computing the workload routing Solution comprises considering one or more of workload-infrastructure compatibility, and available capacity.

7. The method of claim 2, wherein the one or more proximity-based rules comprise at least one of: an affinity rule, an anti-affinity rule, and a group-level anti-affinity rule.

8. The method of claim 1, wherein at least one of the plurality of infrastructure zones corresponds to one or more of a pod, a cabinet, a data center, a blade chassis, and a blade server in the infrastructure.

9. The method of claim 1, further comprising selecting from a plurality of different levels of physical hierarchy of infrastructure.

10. The method of claim 5, wherein the primary proximity group and the corresponding zone type are determined based on a highest level affinity rule.

11. The method of claim 1, wherein one or more constraints used in generating the workload routing solution comprises at least one constraint on the relative placements for groups of workloads in the infrastructure.

12. The method of claim 1, wherein the performance requirements comprise ensuring that all workloads in the sub-group have high network performance.

13. The method of claim 1, wherein the resilience requirements comprise ensuring that different zones are kept apart to avoid a single point of failure.

14. A non-transitory computer readable storage medium comprising computer executable instructions for routing application instances in an information technology infrastructure, the computer executable instructions comprising instructions for:
  defining, from a plurality of workloads, a plurality of groups of workloads, each workload in a same group having similar hosting requirements, each different group of workloads capable of having different hosting requirements than another group of workloads;
  determining at least one application model from the groups of workloads;
  determining an infrastructure proximity zone model comprising a plurality of physical or logical infrastructure zones, each zone comprising a grouping of infrastructure defined by a boundary for keeping groups of workloads together or apart, wherein boundaries of the infrastructure zones are defined by performance or resiliency characteristics of the infrastructure,
    wherein the infrastructure zones include both performance zones and resiliency zones, where a performance zone corresponds to infrastructure located in the same physical or logical location for higher performance and a resiliency zone corresponds to infrastructure not located in the same physical or logical location for higher resiliency;
  computing a workload routing solution based on the at least one application model and the infrastructure proximity zone model, wherein the routing solution specifies a placement of each group of workloads into a corresponding infrastructure zone of the infrastructure zones that satisfies their performance or resiliency requirements based on corresponding performance and resiliency characteristics of the infrastructure zone model,
    wherein the computing includes the evaluation of available capacity in the infrastructure zones; and
  deploying the workloads in the groups to the infrastructure in the infrastructure zones of the information technology infrastructure according to the workload routing solution.

15. A system comprising one or more processors and memory, the memory comprising computer executable instructions for routing application instances in an information technology infrastructure, the computer executable instructions comprising instructions for:
  defining, from a plurality of workloads, a plurality of groups of workloads, each workload in a same group having similar hosting requirements, each different group of workloads capable of having different hosting requirements than another group of workloads;
  determining at least one application model from the groups of workloads;
  determining an infrastructure proximity zone model comprising a plurality of physical or logical infrastructure zones, each zone comprising a grouping of infrastructure defined by a boundary for keeping groups of workloads together or apart, wherein boundaries of the infrastructure zones are defined by performance or resiliency characteristics of the infrastructure,
    wherein the infrastructure zones include both performance zones and resiliency zones, where a performance zone corresponds to infrastructure located in the same physical or logical location for higher performance and a resiliency zone corresponds to infrastructure not located in the same physical or logical location for higher resiliency;
  computing a workload routing solution based on the at least one application model and the infrastructure proximity zone model, wherein the routing solution specifies a placement of each group of workloads into a corresponding infrastructure zone of the infrastructure zones that satisfies their performance or resiliency requirements based on corresponding performance and resiliency characteristics of the infrastructure zone model,
    wherein the computing includes the evaluation of available capacity in the infrastructure zones; and
  deploying the workloads in the groups to the infrastructure in the infrastructure zones of the information technology infrastructure according to the workload routing solution.

16. The system of claim 15, wherein computing the workload routing solution comprises using one or more proximity-based rules.

17. The system of claim 15, wherein computing the workload routing solution comprises selecting infrastructure with the most capacity available or a lower cost.

18. The system of claim 15, wherein computing the workload routing solution comprises:
  sorting the groups based on a routing priority; and
  determining the workload routing solution by evaluating placement of the groups against the infrastructure zones in priority order and iterating until there are no more workloads to route.

19. The system of claim 16, further comprising instructions for determining a primary proximity group and corresponding proximity zone type based on the one or more proximity-based rules.

20. The system of claim 15, wherein computing the workload routing solution comprises considering one or more of workload-infrastructure compatibility, and available capacity.

21. The system of claim 16, wherein the one or more proximity-based rules comprise at least one of: an affinity rule, an anti-affinity rule, and a group-level anti-affinity rule.

22. The system of claim 15, wherein at least one of the plurality of infrastructure zones corresponds to one or more of a pod, a cabinet, a data center, a blade chassis, and a blade server in the infrastructure.

23. The system of claim 15, further comprising instructions for selecting from a plurality of different levels of physical hierarchy of infrastructure.

24. The system of claim 19, wherein the primary proximity group and the corresponding zone type are determined based on a highest level affinity rule.

25. The system of claim 15, wherein one or more constraints used in generating the workload routing solution comprises at least one constraint on the relative placements for groups of workloads in the infrastructure.

26. The system of claim 15, wherein the performance requirements comprise ensuring that all workloads in the sub-group have high network performance.

27. The system of claim 15, wherein the performance requirements comprise ensuring that all workloads in the sub-group have high network performance.

* * * * *